Feb. 24, 1931.    G. H. CHANDLER    1,793,464
CRANBERRY PICKER
Filed Aug. 31, 1927
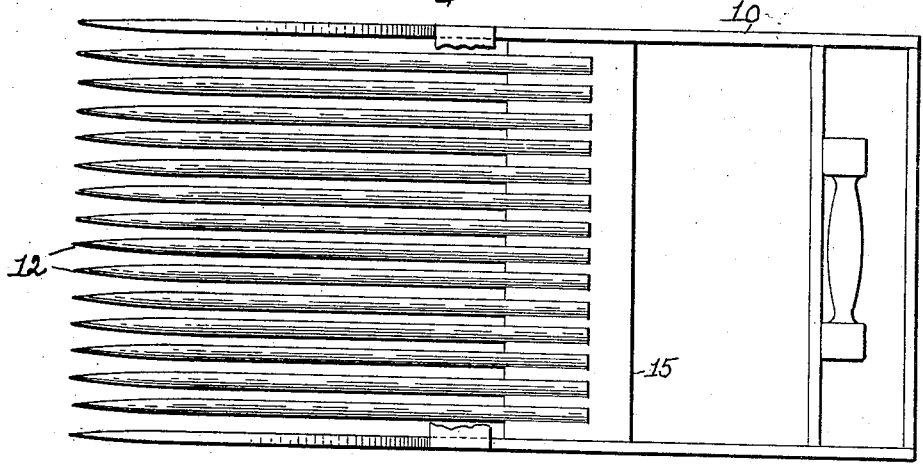
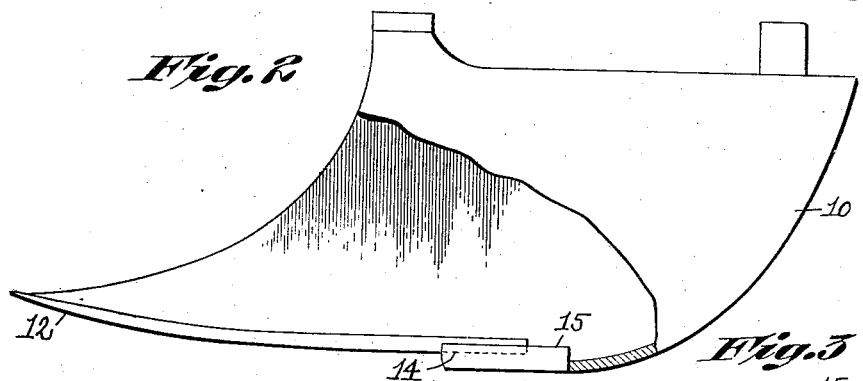
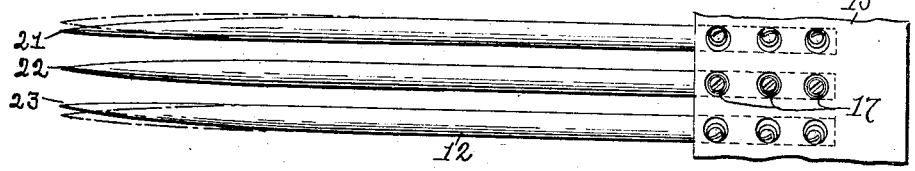
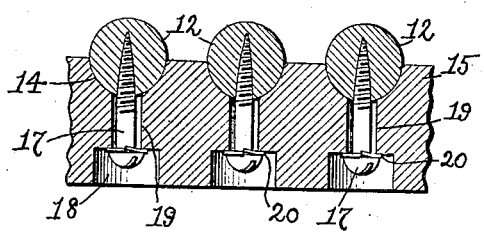
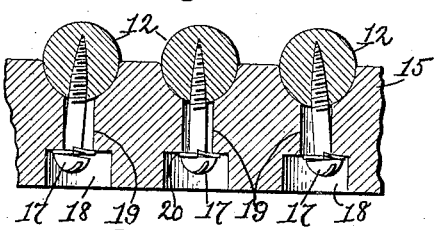
Inventor
George H. Chandler
by Jas. H. Churchill
Atty.

Patented Feb. 24, 1931

1,793,464

UNITED STATES PATENT OFFICE

GEORGE H. CHANDLER, OF MARSHFIELD, MASSACHUSETTS

CRANBERRY PICKER

Application filed August 31, 1927. Serial No. 216,632.

This invention relates to a cranberry picker.

The object of the invention is to provide a novel and improved construction of cranberry picker in which provision is made for operatively supporting the tines or teeth of the picker in a novel and superior manner, adapted to maintain them in alignment, and to permit them to be readily and conveniently repaired or adjusted without the use of special tools or parts.

With this object in view, the invention consists in the cranberry picker hereinafter described and particularly defined in the claims at the end of this specification.

In the drawings illustrating the preferred embodiment of the invention, Figure 1 is a plan view of the improved picker; Fig. 2 is a side elevation with a portion broken away of the picker shown in Fig. 1; Fig. 3 is a detail in inverted plan illustrating the manner of supporting the picker tines; and Figs. 4 and 5 are sectional details to be referred to.

In my United States Patent No. 833,369 I have disclosed a cranberry picker comprising essentially a plurality of tines operatively supported in proper position on a scoop or body portion by means of individual ring-fastening devices.

The present construction of cranberry picker is an improvement upon the cranberry picker of such patent.

In the practical use of my previous cranberry picker, it has been found that a tendency has existed for dirt to force itself under some of the tines and between the tines and ring-fastening devices, thus lifting the tines and causing them to be dislodged from alignment with the other tines of the picker. This interferes with the most efficient operation of the picker.

In some instances in the practical use of the picker of my Patent No. 833,369 it has been desirable to replace tines or fastening devices, and this has caused the consumer to order replacement parts from the manufacturer.

In the present construction of cranberry picker the tines may be adjusted and replaced without the necessity of special parts or special fastening devices, and this enables the consumer to repair his own cranberry picker.

Referring now to the drawing, I have illustrated therein a preferred form of cranberry picker wherein 10 represents the box or scoop into which the berries are deposited and which may be of any usual or suitable construction and is provided at its open end with a plurality of tines or teeth 12 preferably pointed at their free ends and preferably made of wood.

In accordance with the present invention, provision is made for operatively supporting the tines or teeth 12 in a manner such as to permit them to be readily removed without the necessity of special tools and to be securely adjusted in their operative position if they become loose during the use of the picker, and as herein shown the inner end portion of each tine 12 is supported within a semicylindrical groove 14 in a head 15 secured in the bottom of the scoop 10 at or near the open end thereof.

Each tine 12 is firmly but removably secured to the head 15 by a plurality of fastening devices 17 extended upwardly through the bottom of the head and entered into the tine from the undersurface thereof.

As herein shown, in the bottom of the head 15, there are bored a plurality of cylindrical holes 18 for the reception of the heads of the wood screws 17. The shank of each wood screw 17 is arranged to extend through a cylindrical hole 19 connecting the bottom of each hole 18 with the corresponding semicylindrical groove 14, and each hole 19 may and preferably will be made of a diameter larger than the diameter of the shank of the screw for a definite purpose as will be described.

With this construction, therefore, each tine is firmly and removably secured with its inner end supported in a cylindrical groove in the head by a plurality of wood screws 17, and in order to assist in preventing the screws from becoming loosened, a split washer 20 is provided between the head of each screw and the bottom of the hole 18 in the head 15.

With this arrangement the difficulties heretofore experienced because of the tendency of the dirt to dislodge the ring-fastening devices of my prior patented picker, are avoided and the tines of the picker are retained in the desired positions of alignment for long periods of time.

In addition, the present manner of securing the tines to the head 15, enables the tines to be readily replaced with an ordinary screw-driver, and new tines may be substituted for broken tines without the necessity of ordering special fastening devices from the manufacturer. This enables the cranberry gatherer to repair and adjust his own cranberry picker.

In the use of the present cranberry picker, it is sometimes desirable to adjust the tines 12 to even the spaces between adjacent tines, and, as herein shown, by loosening the wood screws 17 it is possible to partially rotate the tines in their semicylindrical supporting grooves in the head and to thereby move some of the tines, such as the alternate tines 21, 23 (Fig. 3), so as to move their curved ends outwardly from the intermediate tine 22, such a position being represented by dotted lines in Fig. 3. After such an adjustment has been made, it is possible to screw up the wood screws and to clamp the tine in such position.

The enlarged opening 19 enables the wood screw to assume a position such as is shown in Fig. 5, and inasmuch as slight rotation of the inner end of the tine produces the desired movement of the outer curved end of the tine, this method of adjustment is sufficient for practical purposes.

Figs. 4 and 5, therefore, illustrate in sectional detail the positions of wood screws 17 corresponding to the positions of the tines in the full and dotted lines in Fig. 3.

It will further be observed that by means of the wood screws extended up through the bottom of the scoop into the lower surface of the tines, the upper surface of the latter is left smooth throughout its length and free from projections which are liable to cause displacement of the tines.

While the preferred embodiment of the invention has been illustrated and described, it will be understood that the invention may be embodied in other forms within the scope of the following claims.

Having thus described the invention, what is claimed is:

1. A cranberry picker comprising a scoop open at its front end and provided with a plurality of grooves, a plurality of tines extended from the front end of the scoop having their inner ends received within said grooves, and means for removably securing each tine to the scoop, including a plurality of wood screws extended through the bottom of the scoop and into the tine to be supported thereby and to move therewith and having the heads of the screws received within holes in the bottom of the scoop and laterally movable therein while engaged with the tine.

2. A cranberry picker comprising a scoop open at its front end and provided with a plurality of grooves, a plurality of tines extended from the front end of the scoop having their inner ends received within said grooves, and means for removably securing each tine to the scoop, including a plurality of wood screws extended through the bottom of the scoop and into the tine to be supported thereby and to move therewith, and holes in the scoop through which the shanks of said screws pass and each of which holes is of greater diameter than the screw extended through it to permit adjustment of the tine.

3. A cranberry picker comprising a scoop open at its front end and provided with a plurality of grooves, a plurality of tines extended from the front end of the scoop having their inner ends received within said grooves, and means for removably securing each tine to the scoop, including a plurality of holes bored in the bottom of the scoop and extended partially therethrough, a plurality of wood screws having their heads engaging the bottoms of said holes and themselves extending into the tines to be supported thereby and to move therewith, and an opening connecting each hole with the tine-supporting groove through which the screw is extended, said opening being of a diameter larger than the shank of the screw and less than said hole.

4. A cranberry picker comprising a scoop open at its front end and provided with a plurality of substantially semi-circular grooves opening upwardly, a plurality of tines extended from the front end of the scoop having their inner ends received within said grooves, and a plurality of fastening devices for each tine, said fastening devices being extended upwardly through the bottom of the scoop into the tine to be supported thereby and to move therewith and to secure the latter to the scoop and leave the upper surface of the tine substantially smooth and free from projections and also being laterally movable while engaged with the tine to permit rotary movement of the tine without disengaging the fastening devices therefrom.

5. A cranberry picker comprising a scoop open at its front end and provided with a bottom having a plurality of grooves, a plurality of tines extended from the front end of the scoop having their inner ends received within said grooves, holes extended from the lower surface of the bottom of the scoop to said grooves, and fastening devices for said tines extended upwardly through the said holes to be supported by and be movable with said tines and laterally movable in said holes to permit rotation of the tines in the grooves without disengagement of said fastening devices from the tines.

In testimony whereof, I have signed my name to this specification.

GEORGE H. CHANDLER.